United States Patent
Bentley et al.

(10) Patent No.: US 8,918,079 B2
(45) Date of Patent: *Dec. 23, 2014

(54) DETERMINING AUTHENTICATION CHALLENGE TIMING AND TYPE

(75) Inventors: Jon Louis Bentley, New Providence, NY (US); George William Erhart, Loveland, CO (US); Lawrence O'Gorman, Madison, NJ (US); Michael J. Sammon, Watchung, NJ (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1004 days.

This patent is subject to a terminal disclaimer.

(21) Appl. No.: 11/942,670

(22) Filed: Nov. 19, 2007

(65) Prior Publication Data
US 2009/0131015 A1    May 21, 2009

(51) Int. Cl.
| | |
|---|---|
| H04M 1/66 | (2006.01) |
| H04W 12/08 | (2009.01) |
| H04L 29/06 | (2006.01) |
| H04W 4/02 | (2009.01) |
| H04L 29/08 | (2006.01) |
| H04W 88/02 | (2009.01) |

(52) U.S. Cl.
CPC .............. *H04W 12/08* (2013.01); *H04L 63/08* (2013.01); *H04L 63/107* (2013.01); *H04W 4/02* (2013.01); *H04L 67/303* (2013.01); *H04L 67/325* (2013.01); *H04L 67/18* (2013.01); *H04W 88/02* (2013.01)
USPC ....................................... 455/411; 455/456.3

(58) Field of Classification Search
CPC ........................ H04L 63/08; H04N 21/6582
USPC ......................................................... 455/411
See application file for complete search history.

(56) References Cited

U.S. PATENT DOCUMENTS

| | | | |
|---|---|---|---|
| 5,768,503 | A | 6/1998 | Olkin |
| 6,014,085 | A | 1/2000 | Patel |
| 6,859,651 | B2 | 2/2005 | Gabor |
| 7,024,556 | B1 | 4/2006 | Hadjinikitas et al. |
| 7,120,129 | B2 | 10/2006 | Ayyagari et al. |
| 7,237,024 | B2 | 6/2007 | Toomey |
| 7,577,987 | B2 | 8/2009 | Mizrah |
| 7,814,324 | B2 | 10/2010 | Blakley et al. |

(Continued)

OTHER PUBLICATIONS

Lee, Jason T., "U.S. Appl. No. 12/241,584 Restriction Requirement Feb. 16, 2011", , Publisher: USPTO, Published in: US.

(Continued)

*Primary Examiner* — Phuoc H Doan

(57) ABSTRACT

An apparatus and methods are disclosed for authenticating users of wireless telecommunications terminals. In particular, the present invention enables the timing and type of authentication challenges to vary based on one or more of: the user's current geo-location, the current day and time, the presence or absence of other nearby users, and the identity of any nearby users. In accordance with the illustrative embodiment, the re-authentication time period (i.e., the length of time between authenticating and re-authenticating a user) and the authentication challenge type (e.g., username/password, fingerprint recognition, etc.) can be determined based on these factors. The present invention is advantageous in that it enables the shortening of the re-authentication time and the selection of a more secure type of authentication challenge when it is more likely that a user's wireless telecommunications terminal might be accidentally left behind or stolen.

14 Claims, 3 Drawing Sheets

(56) References Cited

U.S. PATENT DOCUMENTS

| | | |
|---|---|---|
| 7,860,486 B2 | 12/2010 | Frank et al. |
| 8,009,121 B1 | 8/2011 | Stuart et al. |
| 8,027,665 B2 | 9/2011 | Frank |
| 8,370,639 B2 | 2/2013 | Azar et al. |
| 8,584,200 B2 | 11/2013 | Frank |
| 2002/0152034 A1 | 10/2002 | Kondo et al. |
| 2002/0178359 A1 | 11/2002 | Baumeister et al. |
| 2004/0006710 A1 | 1/2004 | Pollutro et al. |
| 2005/0015592 A1 | 1/2005 | Lin |
| 2005/0097320 A1* | 5/2005 | Golan et al. ............ 713/166 |
| 2006/0089125 A1 | 4/2006 | Frank |
| 2007/0008937 A1 | 1/2007 | Mody et al. |
| 2007/0250920 A1 | 10/2007 | Lindsay |
| 2008/0146193 A1* | 6/2008 | Bentley et al. ............ 455/411 |
| 2008/0162338 A1 | 7/2008 | Samuels et al. |
| 2008/0189768 A1 | 8/2008 | Callahan et al. |
| 2009/0007229 A1 | 1/2009 | Stokes |
| 2009/0013381 A1 | 1/2009 | Torvinen et al. |
| 2009/0023422 A1 | 1/2009 | McInnis et al. |
| 2009/0183248 A1 | 7/2009 | Tuyls et al. |
| 2009/0198820 A1 | 8/2009 | Golla et al. |

OTHER PUBLICATIONS

Lee, Jason T., "U.S. Appl. No. 12/241,584 Office Action May 9, 2011",, Publisher: USPTO, Published in: US.

\* cited by examiner

DETERMINING AUTHENTICATION CHALLENGE TIMING AND TYPE

FIELD OF THE INVENTION

The present invention relates to computer security in general, and, more particularly, to authentication for wireless telecommunications terminals.

BACKGROUND OF THE INVENTION

Wireless telecommunications terminals (e.g., cell phones, personal digital assistants [PDAs] with wireless capabilities, notebook computers with wireless capabilities, etc.) are increasingly being used in the workplace for job-related tasks. Some enterprises have deployed software applications that execute on a server and can be accessed by workers via their wireless terminals. Such applications are commonly referred to as wireless web-based applications or wireless client/server applications, depending on whether or not a browser is used as the user interface on the wireless terminals.

FIG. 1 depicts illustrative telecommunications system 100 in the prior art. As shown in FIG. 1, telecommunications system 100 comprises telecommunications network 105, wireless telecommunications terminal 110, and server 120, interconnected as shown.

Telecommunications network 105 is a network that comprises one or more wireless elements (e.g., wireless access points, wireless base stations, etc.) and is capable of transporting signals between server 120 and other devices, such as wireless telecommunications terminal 110.

Wireless telecommunications terminal 110 is capable of wirelessly transmitting and receiving electromagnetic signals to and from telecommunications network 105 via a wireless transceiver.

Server 120 is a data-processing system that is capable of executing one or more software applications, of hosting one or more resources (e.g., a database, a printer, a file, etc.), and of receiving and transmitting signals via telecommunications network 105.

In some instances it is desirable for security reasons to require that the user of wireless telecommunications terminal 110 be authenticated before the terminal is allowed to access an application or resource on server 120. Typically a user is presented with an authentication challenge, and the user must supply a valid response to the challenge. Examples of different types of authentication challenges include

- requiring a user to furnish his or her username and password;
- requiring a user to consult an electronic token device or a list of numbers in order to furnish a one-time password;
- requiring a user to answer a pre-arranged secret question (e.g., "What is your mother's maiden name?", "What was your first telephone number?", etc.); and
- biometrics (e.g., fingerprint recognition, voice recognition, retinal or iris scan, etc.).

Furthermore, in some instances the user of wireless telecommunications terminal 110 might be periodically challenged (i.e., the user is periodically re-authenticated) for greater security.

SUMMARY OF THE INVENTION

The present invention enables the timing and type of an authentication challenge to a user of a wireless telecommunications terminal to vary based on one or more of:

- the user's current geo-location,
- the current day and time,
- the presence or absence of other nearby users, and
- the identity of any nearby users.

In particular, the illustrative embodiment of the present invention enables the re-authentication time period—i.e., the length of time between authenticating and re-authenticating a user—as well as the authentication challenge type (e.g., username/password, fingerprint recognition, etc.) to be determined based on these factors.

The present invention is advantageous in that it enables the re-authentication time to be shortened (which corresponds to tighter security) in situations where it is more likely that a wireless telecommunications terminal might be accidentally left behind by its user or stolen by another user. For example, it is more likely for a user's wireless telecommunications terminal to be left behind or stolen in a public place (e.g., a train station, a restaurant, a theatre, etc.) than in the user's home. As another example, it is more likely for a user's wireless telecommunications terminal to be left behind or stolen when there are other people nearby—and particularly, when the nearby users are strangers rather than family members or office colleagues. As yet another example, it is more likely that a "malicious" user A is trying to use a wireless telecommunications terminal that belongs to user B when the current geo-location of the terminal at the current time is not consistent with a schedule for user B, or is not consistent with historical patterns for user B (e.g., at work between 8:00 am and 5:00 pm on weekdays, etc.)

The present invention also enables the type of authentication challenge to vary based on the likelihood that a user's wireless telecommunications terminal might have been left behind or stolen. For example, when a wireless telecommunications terminal is in the home of its registered user, the authentication challenge type might be username/password, while a wireless telecommunications terminal in an airport might issue a biometric authentication challenge, which is typically more secure than username/password.

The illustrative embodiment comprises: presenting a first authentication challenge at a wireless telecommunications terminal W at time $t_1$; and presenting a second authentication challenge at the wireless telecommunications terminal W at time $t_2$; wherein the magnitude of $t_2-t_1$ is based on the geo-location of the wireless telecommunications terminal W at one or more instants in time interval $[t_1, t_2]$.

DETAILED DESCRIPTION

Figure 1:
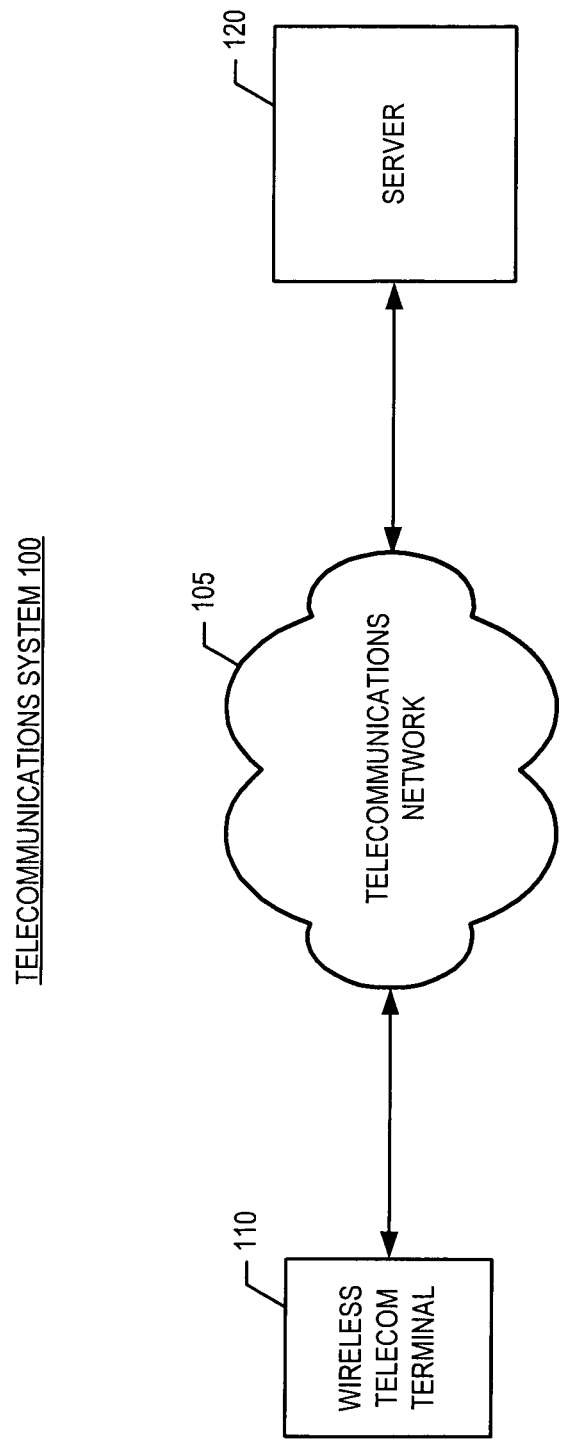
FIG. 1 depicts the salient elements of illustrative telecommunications system 100 in accordance with the prior art.
Figure 2:
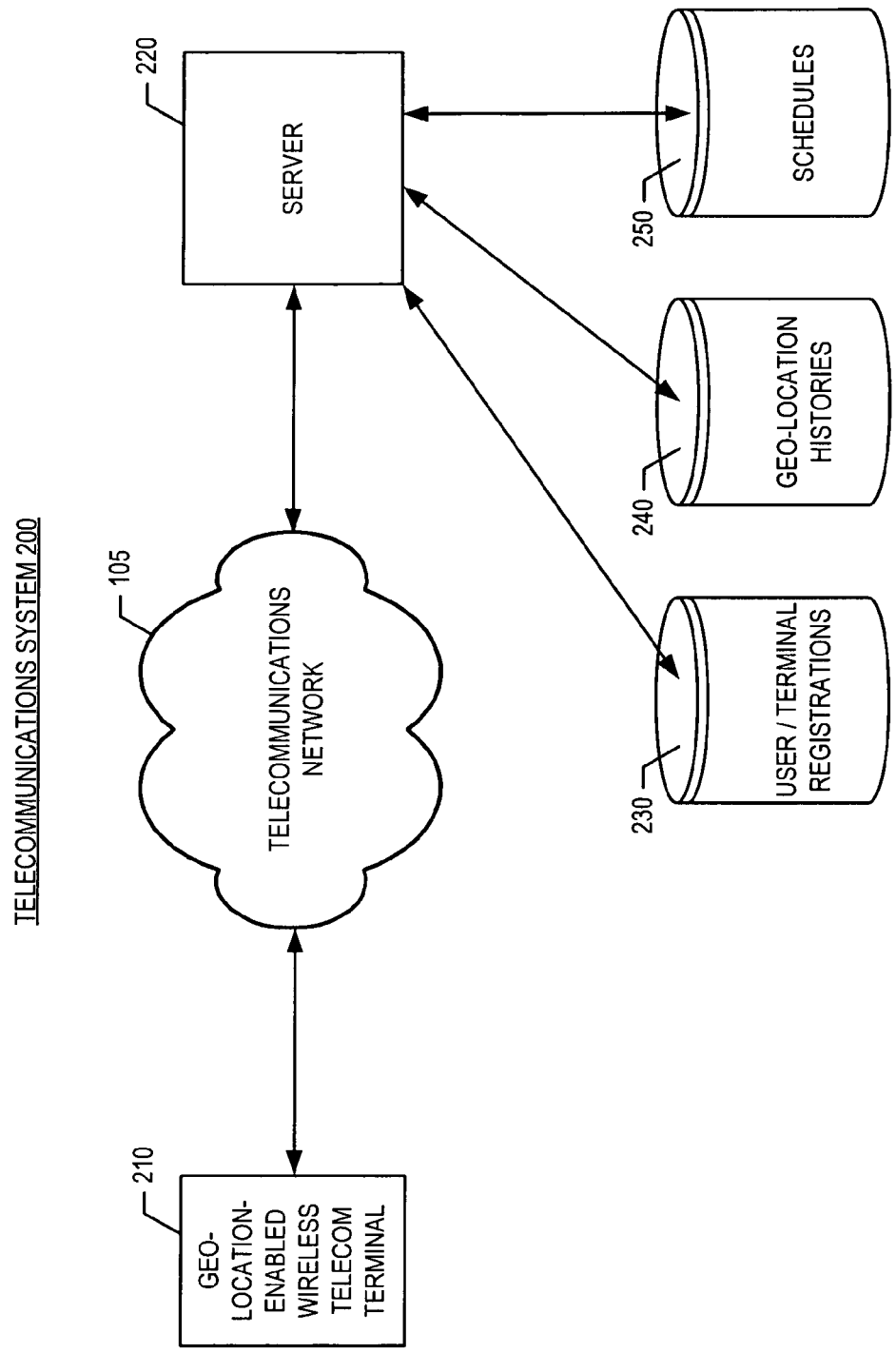
FIG. 2 depicts the salient elements of telecommunications system 200 in accordance with the illustrative embodiment of the present invention.

FIG. 2 depicts the salient elements of telecommunications system 200 in accordance with the illustrative embodiment of the present invention. As shown in FIG. 2, telecommunications system 100 comprises telecommunications network 105, geo-location-enabled wireless telecommunications terminal 210, server 220, user/terminal registration store 230, geo-location store 240, and user schedules store 250, interconnected as shown.

Geo-location-enabled wireless telecommunications terminal 210 is capable of wirelessly transmitting and receiving electromagnetic signals to and from telecommunications network 105 via a wireless transceiver, in well-known fashion, and of estimating and reporting its geo-location. As will be appreciated by those skilled in the art, there are a variety of well-known techniques by which terminal 210 can estimate its geo-location based on received electromagnetic signals (e.g., via a Global Positioning System (GPS) receiver, via triangulation, via RF fingerprinting, etc.), and it will be clear to those skilled in the art, after reading this specification, how to make and use embodiments of the present invention for terminals that use these methods—as well as embodiments in which the estimation of terminal 210's geo-location is performed by an entity other than wireless terminal 210. As will further be appreciated by those skilled in the art, wireless telecommunications terminal 210 might communicate via one or more protocols (e.g., Code Division Multiple Access [CDMA], Institute of Electrical and Electronics Engineers [IEEE] 802.11, Bluetooth, etc.), and it will be clear to those skilled in the art, after reading this specification, how to make and use embodiments of the present invention based on these protocols.

Server 220 is a data-processing system that is capable of executing one or more software applications, of receiving and transmitting signals via telecommunications network 105, and of performing the tasks described below and with respect to FIG. 3.

User/terminal registration store 230 is a memory that associates wireless telecommunications terminals with their registered users. For example, an entry in user/terminal registration store 230 might be (555-555-5555, 123-45-6789), where 555-555-5555 is the telephone number of a particular terminal, and 123-45-6789 is the social security number of the user to whom the terminal is registered.

Geo-location store 240 is a memory that stores the current geo-location of one or more wireless terminals, including wireless telecommunications terminal 210, as well as information concerning the geo-location of these terminals at various times in the past (i.e., geo-location histories). As will be appreciated by those skilled in the art, in some embodiments the historical geo-location information might be stored as a time-series (i.e., time/geo-location pairs), while in some other embodiments the historical information might be encoded in a more abstract form that has been derived from raw data (e.g., "May 15, 2007: midnight-8 am home, 9 am-5 pm office, 6 pm-midnight home", etc.), and it will be clear to those skilled in the art, after reading this disclosure, how to make and use such embodiments of the present invention.

User schedules store 250 is a memory that stores schedule information (e.g., meetings, vacations, etc.) for one or more users, in well-known fashion. As will be appreciated by those skilled in the art, in some embodiments of the present invention this information might be advantageously uploaded automatically from calendars stored in the users' wireless telecommunications terminals.

Figure 3:
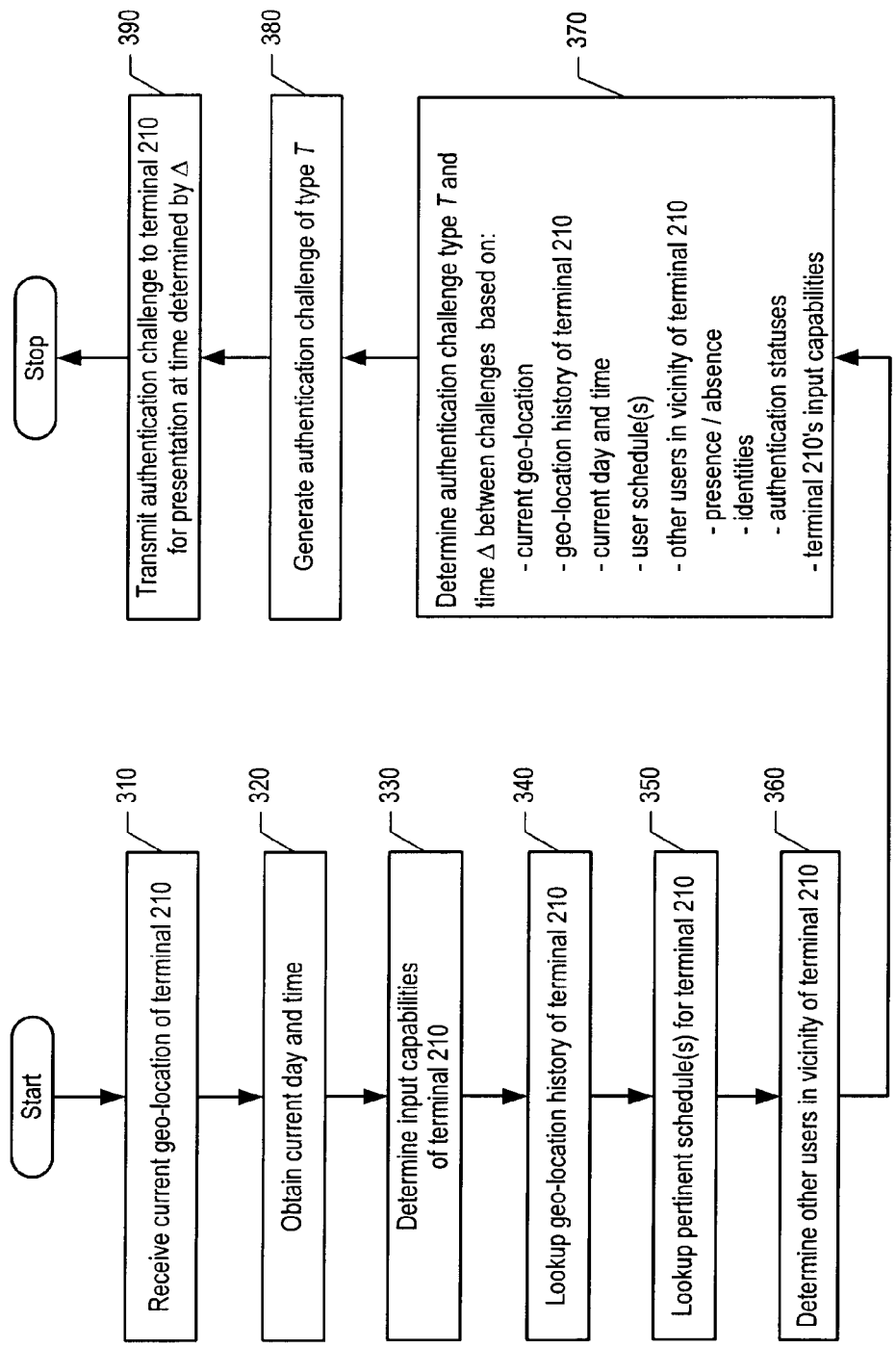
FIG. 3 depicts a flowchart of the salient tasks of server 220, as shown in FIG. 2, in accordance with the illustrative embodiment of the present invention.

FIG. 3 depicts a flowchart of the salient tasks of server 220, in accordance with the illustrative embodiment of the present invention.

At task 310, server 220 obtains the current geo-location of wireless telecommunications terminal 210 from geo-location store 240, in well-known fashion.

At task 320, server 220 obtains the current day and time. As will be appreciated by those skilled in the art, in some embodiments server 220 might obtain the current day and time from its own clock, while in some other embodiments server 220 might obtain the current day and time from an external source.

At task 330, server 220 determines the input capabilities of wireless telecommunications terminal 210. As will be appreciated by those skilled in the art, task 330 might be accomplished in a variety of ways: for example, in some embodiments wireless telecommunications terminal 210 might report its manufacturer and model (e.g., Apple iPhone®, etc.) and server 220 might consult a database mapping terminal manufacturer/model to input capabilities; while in some other embodiments, server 220 might transmit a message to wireless telecommunications terminal 210 explicitly asking for its input capabilities. In any case, it will be clear to those skilled in the art, after reading this disclosure, how to make and use embodiments of the present invention that are capable of performing task 330.

At task 340, server 220 looks up the current geo-location and geo-location history of wireless telecommunications terminal 210 in store 240, in well-known fashion.

At task 350, server 220 looks up any pertinent schedule(s) and schedule entries for wireless telecommunications terminal 210 in store 250, in well-known fashion.

At task 360, server 220 determines what other wireless telecommunications users are in the vicinity of wireless telecommunications terminal 210 via lookups to geo-location store 240 and user/terminal registration store 230, in well-known fashion.

At task 370, server 220 determines an authentication challenge type T and time Δ between challenges based on:
  the current geo-location of wireless telecommunications terminal 210,
  the geo-location history of wireless telecommunications terminal 210,
  the current day and time,
  the user schedule(s) consulted at task 340,
  the presence or absence of other users in the vicinity of wireless telecommunications terminal 210,
  the identities of other users in the vicinity of wireless telecommunications terminal 210,
  the authentication statuses of other users in the vicinity of wireless telecommunications terminal 210, and
  the input capabilities of wireless telecommunications terminal 210.

At task 380, server 220 generates an authentication challenge of type T, in well-known fashion.

At task 390, server 220 transmits the authentication challenge to wireless telecommunications terminal 210 such that it is presented to the terminal's user at a time in accordance with Δ. After task 390, the method of FIG. 3 terminates.

As will be appreciated by those skilled in the art, although in the illustrative embodiment server 220 might host one or more software applications in addition to handling authentication, in some other embodiments of the present invention distinct servers might be employed for these functions, and it will be clear to those skilled in the art, after reading this specification, how to make and use such embodiments.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    determining a first location of a first wireless device at a point in time;
    determining input capabilities of the first wireless device;
    based on the first location of the first wireless device, determining a second location of a second wireless device relative to the first location of the first wireless device at the point in time; and
    generating, via a processor, an authentication challenge, wherein a type of the authentication challenge is based on the second location of the second wireless device relative to the first location of the first wireless device, and based on the input capabilities of the first wireless device.

2. The method of claim 1, wherein the type of authentication challenge is also based on a history of a geo-location of the first wireless device.

3. The method of claim 1, wherein the type of authentication challenge is also based on a current day and time at the first wireless device.

4. The method of claim 1, wherein the first wireless device is registered to a user, and wherein the type of authentication challenge is also based on an identity of a second user to which the second wireless device is registered to.

5. The method of claim 1, wherein the type of the authentication challenge is based on a geo-location of the first wireless device, a current day and time at the first wireless device, a presence of a user around a vicinity of the first wireless device, and an identity of the user around the vicinity of the first wireless device.

6. The method of claim 5, further comprising determining a re-authentication period for a user authenticated at the first wireless device based on the second location of the second wireless device.

7. The method of claim 1, wherein the type of authentication challenge comprises a biometric authentication challenge when the first wireless device is located at a public place and when an unknown user is located within a vicinity of the first wireless device.

8. The method of claim 1, wherein the second location of the second wireless device comprises a distance of the second wireless device to the first wireless device and the point in time comprises a current day and time, and wherein a re-authentication period is based on the second location and the point in time.

9. A system comprising:
    a processor; and
    a computer-readable storage medium having stored therein instructions which, when executed by the processor, cause the processor to perform operations comprising:
        determining a first location of a first wireless device at a point in time;
        determining input capabilities of the first wireless device;
        based on the first location of the first wireless device, determining a second location of a second wireless device relative to the first location of the first wireless device at the point in time; and
        generating an authentication challenge, wherein a type of the authentication challenge is based on the second location of the second wireless device relative to the first location of the first wireless device, and based on the input capabilities of the first wireless device.

10. The system of claim 9, wherein the type of authentication challenge is also based on a schedule that has one or more entries associated with a user.

11. The system of claim 9, wherein the first wireless device is registered to a user, and wherein the type of authentication challenge is also based on whether there is a second wireless device that is registered to a different user than the user.

12. A method comprising:
    generating, via a processor, an authentication challenge for a current user of a first wireless device, wherein the first wireless device is registered to the current user, wherein the authentication challenge is generated based on determined input capabilities of the first wireless device, and wherein a type of the authentication challenge is based on whether there is a second wireless device that:
        (i) is in a vicinity of the first wireless device, and
        (ii) is registered to a different user than the current user in a user-terminal registration store.

13. The method of claim 12, wherein the type of the authentication challenge is also based on an identity of the current user.

14. The method of claim 12, wherein the type of the authentication challenge is also based on whether a user associated with the second wireless device has been authenticated.

* * * * *